United States Patent [19]

Elliott et al.

[11] 3,879,757

[45] Apr. 22, 1975

[54] DATA STORAGE MECHANISM HAVING A FLEXIBLE MAGNETIC DISK

[75] Inventors: James Francis Elliott, Rochester; Joel Swenum Johnson, Millville, both of Minn.

[73] Assignee: International Business Machines Corporation, Armonk, N.Y.

[22] Filed: Mar. 1, 1974

[21] Appl. No.: 447,454

[52] U.S. Cl. .................................. 360/99; 360/130
[51] Int. Cl. .......................................... G11b 5/16
[58] Field of Search ............................. 360/99, 130

[56] References Cited

UNITED STATES PATENTS

| | | | |
|---|---|---|---|
| 3,703,713 | 11/1972 | Pohm et al. | 360/99 |
| 3,731,292 | 5/1973 | Kelley | 360/99 |

*Primary Examiner*—Vincent P. Canney
*Attorney, Agent, or Firm*—Keith T. Bleuer

[57] ABSTRACT

The data storage mechanism employs a thin, flexible disk having magnetic recording surfaces on both sides and disposed in a carrying envelope. The envelope has an elongate slot in both thicknesses to permit magnetic read/write heads to make contact with magnetic disk surfaces. A pair of pressure pads are disposed on both sides of the envelope, laterally and equally spaced from the read/write head on each side of the envelope; and the pads hold the disk substantially fixed in the direction extending axially of the disk. An eccentric carries the read/write heads so as to swing the heads about a propelling screw therefor and cause one or the other of the read/write heads to move into contact with a magnetic surface of the disk.

4 Claims, 7 Drawing Figures

DATA STORAGE MECHANISM HAVING A FLEXIBLE MAGNETIC DISK

CROSS REFERENCE TO RELATED APPLICATION

This application is related to an application by James F. Elliott, Ser. No. 406,137, filed Oct. 12, 1973, for Data Storage Apparatus Employing A Flexible Magnetic Disk.

BACKGROUND OF THE INVENTION

The invention relates to Magnetic Disk Data Storage Mechanism and in particular to such storage mechanisms employing flexible magnetic disks contained in protective envelopes therefor.

It has previously been proposed to provide data storage apparatus which employs a thin, flexible magnetic disk contained in an envelope, such as in Dalziel, et al U.S. Pat. No. 3,678,481. In this prior construction, only one side of the magnetic disk was used for receiving information, and the information was imparted to this side of the disk by means of a magnetic read/write head. A pressure pad was axially disposed with respect to the read/write head and was effective on the other side of the disk to brace the disk with respect to the magnetic head.

SUMMARY OF THE INVENTION

It is an object of the invention to provide an improved data storage mechanism utilizing a flexible disk which is encased in a protective envelope and which allows both sides of the disk to have information encoded thereon and readable therefrom.

It is still a more particular object of the invention to provide a pair of read/write magnetic heads on opposite sides of the flexible disk with both of the heads being carried by a common carriage which is swingable so that one or the other of the magnetic heads may be brought into contact with the disk. The envelope is held fixed, and each of the heads when active is held by the carriage in firm contact with the disk so that information may be reliably encoded on or read from either side of the disk.

In a preferred embodiment, a stationary frame is provided with opposite slots into which the disk encased in its protective envelope may be moved. The frame carries a motor driven disk-engaging driving flange or rim, and a cover is hingably mounted on the frame and carries a cooperating rotatable collet for engaging the disk between the flange and collet when the cover is closed with respect to the frame. A U-shaped carriage embraces the disk and protective envelope and has a read/write head in each of its two legs which are adapted to extend through slots provided in the envelope to engage with a magnetic surface on the disk. The carriage can be moved vertically, by a rotatable driving lead screw which extends through the carriage for so moving the carriage to cause the read/write heads to be opposite different magnetic tracks on the disk surfaces. An eccentric is drivingly connected with the carriage so that the carriage may be swung to bring either one of the magnetic heads into engagement with a magnetic surface of the disk, depending on which way the eccentric is rotated. A pair of pads are disposed on opposite sides of the carriage on both sides of the disk, and these pads are fixed so that the disk is substantially immovable axially of the disk. Since the disk is flexible, it is deformed under the force of a magnetic head in contact with a magnetic surface of the disk while being held stationary by the pads, during a transferral of information between the magnetic surface and the magnetic head.

DESCRIPTION OF THE PREFERRED EMBODIMENT

Figure 1:
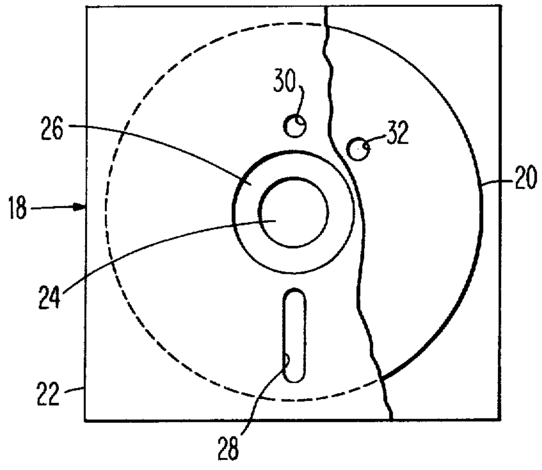
FIG. 1 is a plan view of a flexible magnetic disk with its enclosing protective envelope which may be used with the apparatus of the invention (the envelope is partially broken away for more clearly illustrating the magnetic disk therein)
Figure 4:
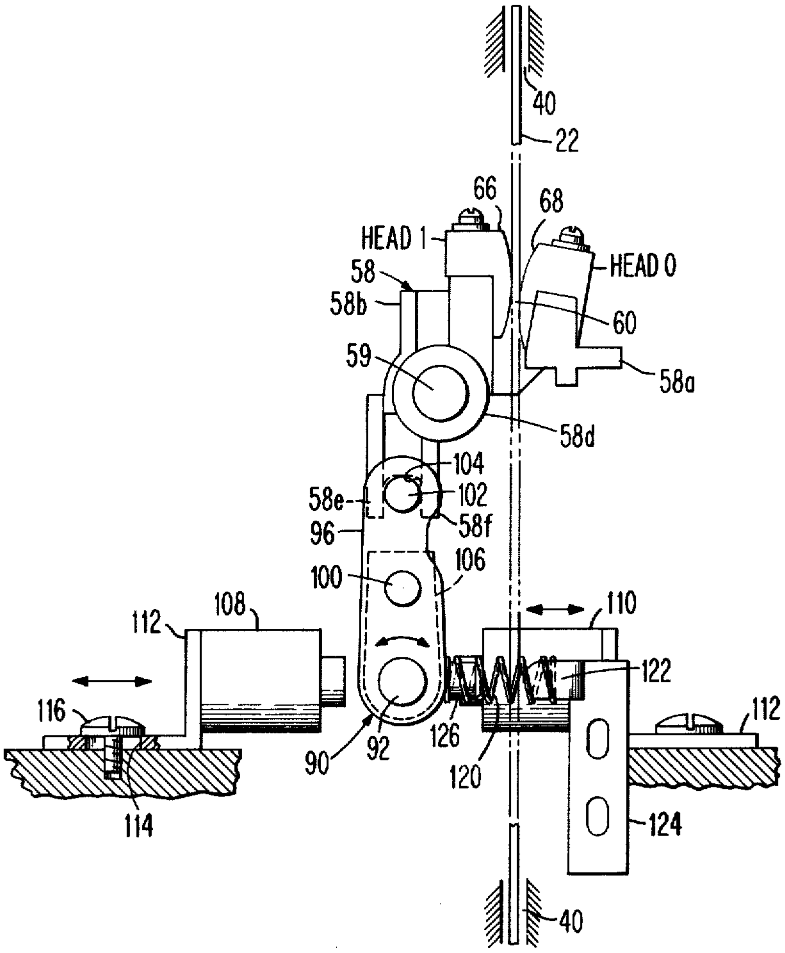
FIG. 4 is a sectional view taken on line 4—4 of FIG. 2.

Referring to FIG. 1 in particular, the magnetic disk assembly 18 utilized by the data storage mechanism of the invention may be seen to comprise a magnetic disk 20 disposed within a square envelope 22. The disk 20 is of a thin, flexible material, such as polyethylene terephthalate of about .003 inch thickness, and the disk 20 has an unorientated $FE_2O_3$ coating on both sides. The envelope 22 may be of rigid vinyl sheet material of .010 inch thickness, for example. The disk 20 has a central opening 24, and the envelope 22 has larger central openings 26 in its two thicknesses. In addition, the envelope 22 has aligned radial slots 28 and aligned round openings 30 in its two thicknesses. The openings 30 are adapted to align with an opening 32 in the disk 20 as the disk 20 rotates within the envelope 22. An assembly of this type is disclosed in U.S. Pat. No. 3,668,658 issued June 6, 1972, which may be referred to for more detail.

The data storage mechanism includes a backbone or frame 34 (see FIGS. 2 and 3) having a cover 36 swingably mounted thereon by means of a hinge 38. The frame 34 is formed with a pair of oppositely, downwardly tapering slots 40 for receiving a disk assembly 18. A shaft 42 is rotatably mounted in the frame 34 and is formed with a drive rim or flange portion 44 and with a central countersunk depression 46 in one end of the shaft 42. A pulley 48 is fixed on the other end of the shaft 42, and the pulley 48 is driven from a drive motor 50 located on the bottom of the frame 34, the drive being by means of a belt 52 which extends around the pulley 48 and around the output pulley 54 of the motor 50.

The cover 36 has a tapered collet 56 rotatably mounted therein and supported by a spring 57, and the collet 56 is adapted to enter the countersunk depression 46 in the end of the shaft 42 when the cover 36 is swung toward the frame 34 so as to capture a disk 20 between the collet 56 and the rim 44 for driving the disk. Any suitable latching means may be used for holding the cover 36 in this position clamping a disk 20 between the collet 56 and the rim 44.

A U-shaped carriage 58 (see FIGS. 1, 2, 4, 6 and 7) is carried by the frame 34 by means of a lead screw 59. The carriage 58 is formed by a pair of opposite arm portions 58*a* and 58*b* providing a slot 60 between them. The screw 59 extends through and has threaded engagement within a pair of spaced lug portions 58*c* and 58*d* integrally formed with the portion 58*b*, and the screw 59 is journaled with respect to the frame 34 by means of a bearing 62 at the upper end of the screw 59 and a stepping motor 64 (see FIG. 3) located at the bottom of the frame 34 and fixed to a lower surface of the frame 34.

The slot 60 is adapted to receive the disk assembly 18, and magnetic transducer heads 66 and 68 are respectively carried by the arm portions 58*b* and 58*a* and have their data recording and reading surfaces on the internal faces of the arm portions 58*b* and 58*a*.

The frame 34 is provided with a pair of spaced pads 70 and 72 (see FIGS. 3 and 6) which are adapted to engage with an assembly 18 when positioned in the slots 40, with the pads 70 and 72 being located on opposite sides of the slots 28 in the disk assembly 18. A pair of pads 74 and 76 (see FIGS. 2, 5 and 6) are provided opposite the pads 70 and 72, with the construction being such that the disk assembly 18 is disposed between the pads 70 and 72 on one side and the pads 74 and 76 on the other side. The pads 74 and 76 constitute parts or portions of a movable pad forming member 78 which is pivoted about a pivot edge 80 that contacts an opposite surface portion of the frame 34. A pair of screws 82 and 84 extend through corresponding openings in the member 78 and are screwed into the frame 34, and springs 86 and 88 are disposed about the shafts of the screws 82 and 84 and bear on the heads of the screws and onto the face portions of the member 78 surrounding the openings therein through which the screws 82 and 84 extend. The member 78 is thus yieldably held to clamp the assembly 18 in place, with the disk assembly fitting within the slot 60 of the carriage 58. The pads 70, 72, 74 and 76 in their clamping action bear on the areas 22*a* and 22*b* of the envelope; and, under these conditions surface 78*b* of member 78 is flush with and bears against a part of frame 34 (see FIG. 5).

Figure 6:
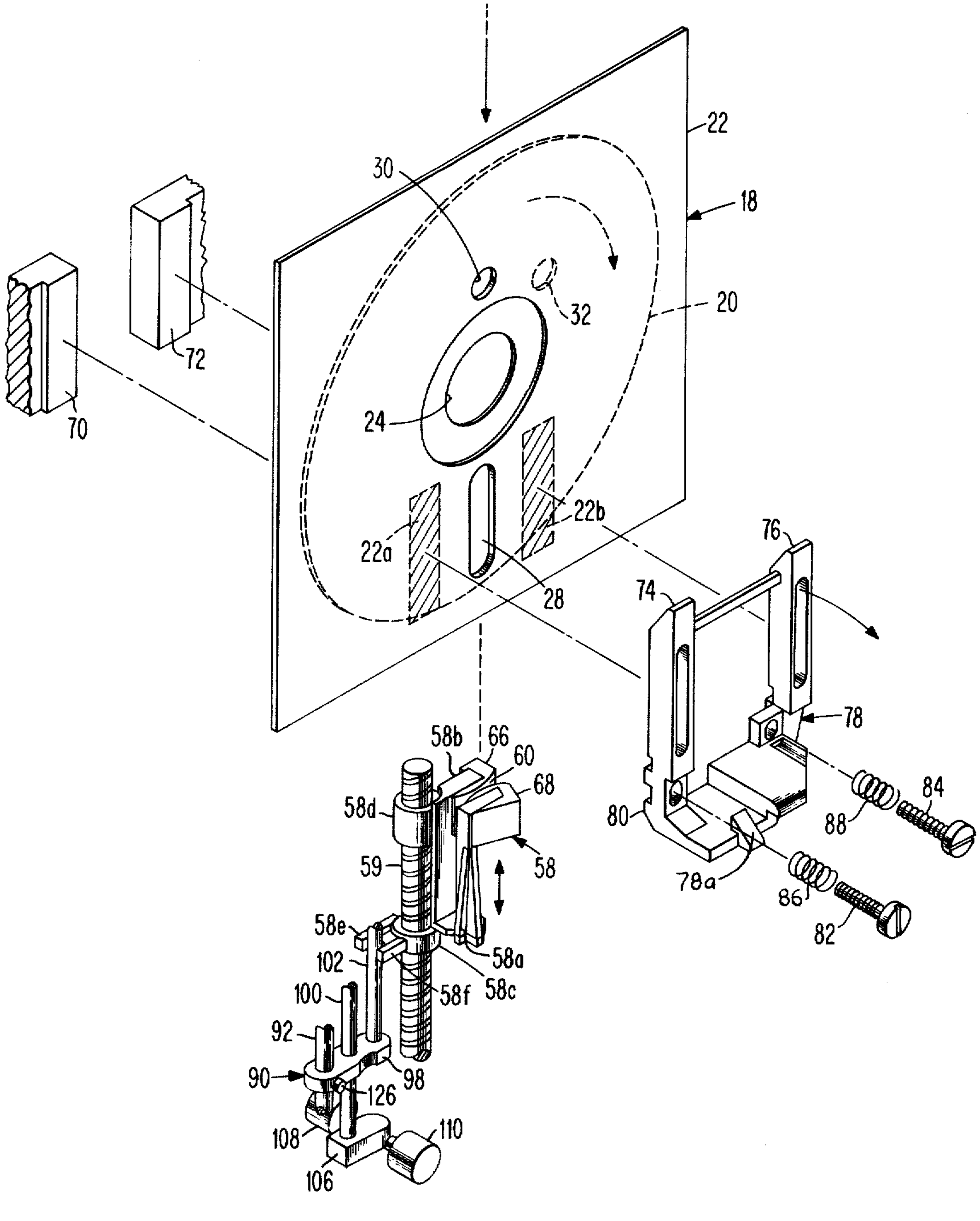
FIG. 6 is an exploded perspective view of certain internal mechanism of the apparatus.
Figure 7:
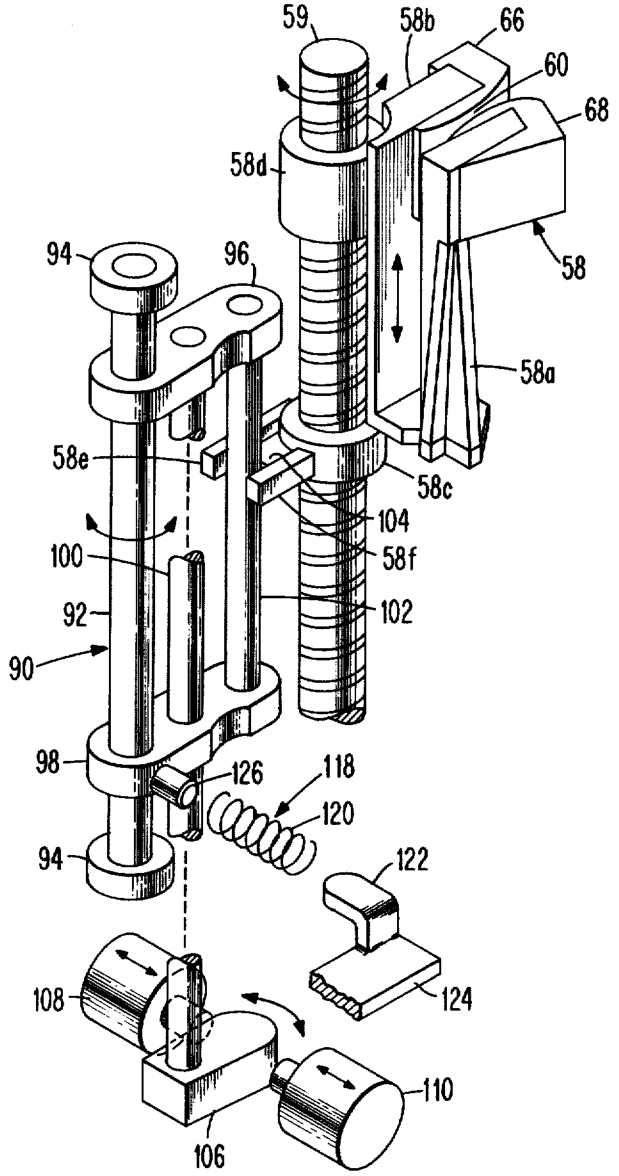
FIG. 7 is another exploded view of internal mechanism of the apparatus.

The carriage 58 is oscillated so as to bring either the magnetic head 66 or the magnetic head 68 into information transferring contact with a surface of the disk 20 by means of an eccentric 90 (see FIGS. 6 and 7). The eccentric 90 comprises a shaft 92 which is swingably mounted in the frame 34 by means of journals 94. The eccentric 90 also comprises a pair of arms 96 and 98 in which shafts 100 and 102 are fixed. The shaft 102 fits in a slot 104 of the carriage 58 provided by a pair of tangs 58*e* and 58*f* extending sidewardly and joined to the part 58*b* of the carriage 58.

The shaft 100 has an arm 106 fixed to it on its lower end, and a pair of solenoids 108 and 110 are located adjacent to and on opposite sides of the arm 106. The shafts 100, 92 and 102 are preferably of metal while the arms 96 and 98 may be of plastic. The arm 106 is of magnetic material so as to be attracted by the solenoids 108 and 110 when energized, and this construction assures that the solenoids 108 and 110 are located quite remote from the magnetic heads 66 and 68 so as to assure that there is no magnetic interference between the solenoids 108 and 110 and the magnetic heads. Each of the solenoids 108 and 110 is fixed with respect to the frame 34 by means of an adjustable bracket 112 so as to thereby adjustably position the solenoids with respect to the magnetic arm 106. Each bracket 112 has a slot 114 in it, and a screw 116 extends through the slot 114 and into the frame 34. Each solenoid 108 and 110 may be adjusted simply by releasing the screw 116, re-positioning the bracket 112 along with the corresponding solenoid and then re-tightening the screw 116.

The eccentric 90 is yieldably held in a neutral position, with both of the magnetic heads 66 and 68 being out of contact with the disk 20, by means of spring detent mechanism 118 (see FIG. 7). The mechanism 118 comprises a spring 120 which fits tightly onto a spring guide pin 122 carried by a spring anchor 124. The anchor 124 is fixed onto the frame 34, as by a pair of screws. The spring 120 fits on a spring guide pin 126 carried by the arm 98. The spring 120 tends to remain in its straight form, along the major axis of the arm 98; and the spring 120 thus tends to hold the arm 98 and the rest of the eccentric 90 in its neutral position with heads 60 and 66 being out of engagement with the disk 20.

Figure 5:
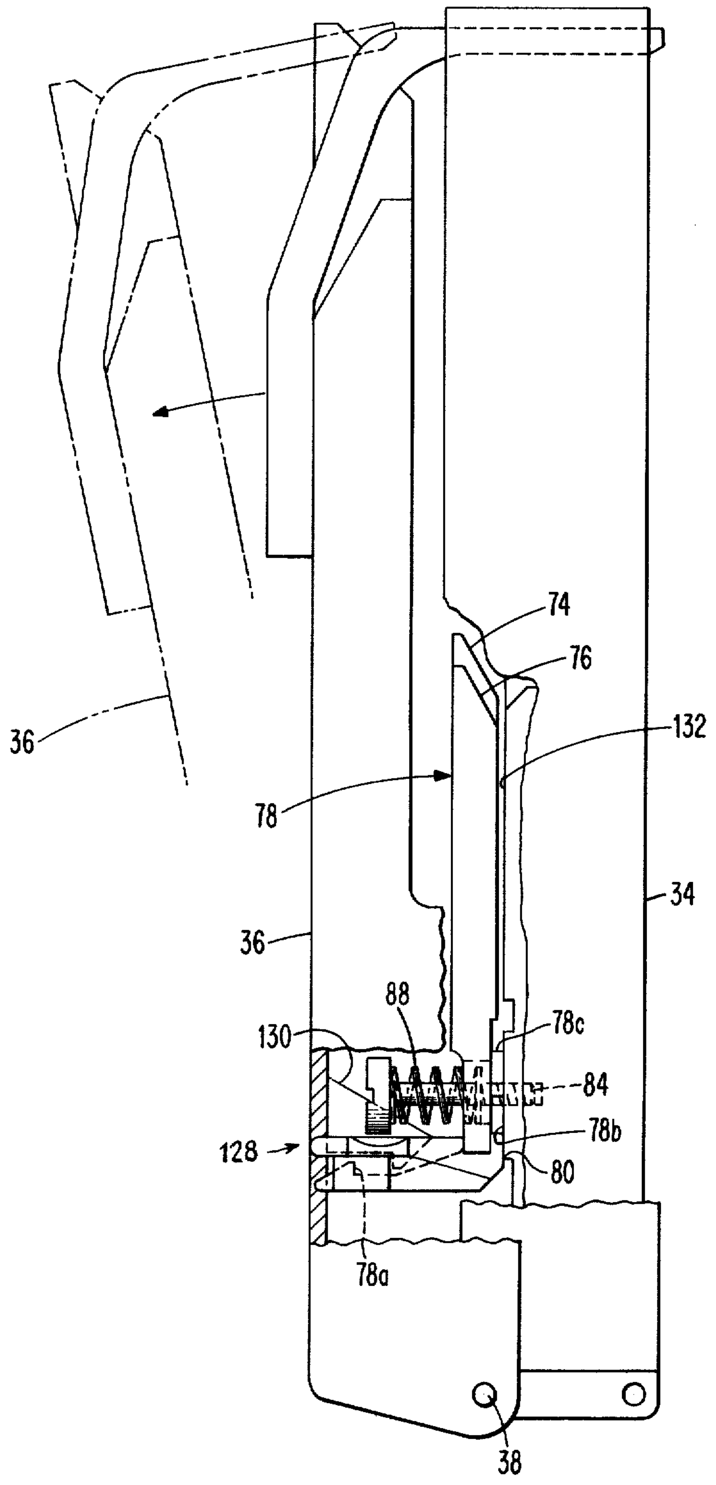
FIG. 5 is a sectional view taken on line 5—5 of FIG. 3.

Referring to FIG. 5, an interconnection 128 is provided between the pad member 78 and the cover 36. The interconnection 128 comprises a hook 130 formed on the cover 36 and a hook portion 78*a* formed on the pad member 78. As is apparent from FIG. 5, when the cover 36 is swung open with respect to the frame 34, swinging about pivot 38; the hook 130 pulls the hook portion 78*a* downwardly and to the left as seen in FIG. 5 so as to cause the pad member 78 to pivot about the pivot edge 80. The pad member 78 thus is moved to the left as seen in FIG. 5 against the action of the springs 86 and 88 so as to open the pad member 78 with respect to the pads 70 and 72 fixed on the frame 34. A disk-envelope assembly 18 may then be dropped into place in the slots 40. In the event that the cover 36 is removed from the rest of the machine for servicing of the machine; subsequently, when the cover 36 is again replaced on the machine and is swung back toward closed position with respect to the frame 34, the hook 130 on the cover snaps past the hook portion 78*a* on the pad member 78 so that the hook 130 and hook portion 78*a* again are in the relationship as is shown in FIG. 5. As will be observed from FIG. 5, when the pad member 78 is in a normal position with the cover 36 closed, a lower surface 78*b* is in contact with a corresponding opposite surface of the frame 34, limiting the swinging movement of the member 78 under the action of the springs 86 and 88. The pads 74 and 76 are undercut with respect to the surface 78*b* so that a slot 132 is provided between the pads 70 and 72 on one side and the pads 74 and 76 on the other side. The bottom of the slot 132 is defined by the surface 78*c* on the pad member 78.

In the operation of the data storage mechanism, the cover 36 is swung outwardly with respect to the frame 34 about the pivot 38; and this has the effect of swinging the pad member 78 outwardly with respect to the frame 34 about the pivot edge 80 due to the action of the interconnection 128 (see FIG. 5). The disk assembly 18 is then dropped into the slots 40 and slides downwardly to the bottoms of the slots 40. Under these conditions, the bottom edge of the envelope 22 clears the surface 78*c*. The central opening 24 in the disk 20 is, under these conditions, approximately in alignment with the counterbore 46 and with the collet 56. The cover 36 is then swung inwardly toward the frame 34 about the pivot 38, and the collet 56 is thereby moved through the disk opening 24 and into the counterbore 46. It will be noted that the collet 56 is tapered, and this movement of the collet 56 into the counterbore 46 has the effect of centralizing the disk 20 with respect to the central axis of the collet 56 and of the shaft 42. The disk 20 is at this time gripped between the collet 56 and the rim 44 on the shaft 42, so that the disk 20 is rotated within the stationary envelope 22 by means of the motor 50 driving through the belt 52 and the pulleys 54 and 48 (see FIG. 2).

At the same time as the cover 36 is swung toward closed position with respect to the frame 34, the pad member 78 swings backwardly (toward frame 34) about the pivot edge 80. The assembly 18 is positioned in the slot 132, with the pads 70, 72, 74 and 76 (see FIG. 6) contacting the envelope 22 at surfaces **22*a* and 22*b* on opposite sides of the slots 28 along the plane of disk 20 and thus gripping the assembly 18 to hold it from any movement in the direction axially of the openings 26 and 30. The envelope 22 is not so gripped to such an extent that the rotary motion of the disk 20 under the driving action of the motor 50** is materially impeded.

Initially, neither of the solenoids 108 and 110 is energized, and the centering mechanism 118 is effective to hold the eccentric 90 in a neutral position and to thereby hold the carriage 58 in a neutral position in which neither of the magnetic transducing heads 66 and 68 is in engagement with the disk 20 (see FIG. 7). The centering mechanism 118 is effective for this purpose; since, as has been described, the spring 120 tends to remain straight and in alignment with the major axis of the arm 98.

When it is desired that information shall be either read from or written on one of the surfaces of the disk 20, one or the other of the solenoids 108 and 110 is energized. If it is desired that the magnetic head 66 be in information transferring contact with respect to the disk 20, the solenoid 108 is energized; and this has the effect of swinging the eccentric 90 about its journals 94 and the center of the shaft 92 toward the solenoid 108. The solenoid 108 is effective on the magnetic arm 106 for this action, and the swinging movement is against the centering effect of the centering mechanism 118. The spring 120 is bent slightly against its yielding action to allow this swinging movement of the eccentric 90. The shaft 102, in moving with the eccentric 90, rotates the carriage 58 about the lead screw 59, with the shaft 102 bearing against the tang portion **58*e* of the carriage 58. This swinging movement of the carriage brings the magnetic head 66 into contact with the disk 20 with the transducer 66 extending through one of the slots 28 in the envelope 22**.

The pad member 78 and, in particular, the pads 74 and 76 under these conditions, provide a restraint on and support the assembly 18 and prevent substantial movement of the assembly 18 along with the magnetic head 66. Under these conditions, the portions of the envelope 22 between the areas **22*a* and 22*b* flex slightly along with flexing of the disk 20; and, in particular, the disk 20, being of thin resilient material, flexes within the slot 28 receiving the head 66. The head 66, when in contact with the disk 20, thus slightly bows the disk around the head 66, and the actual force of the transducer 66 on the disk 20 is actually a function of the resilience of the disk 20. The disk 20 is very thin, as above described, and thus has a low spring constant or resilience; and the disk 20 can be moved more or less into the transducer 66 with a relatively great tolerance, while still maintaining reliable reading and writing action. The amount of bowing of the disk 20 about the transducer 66 and the force of the transducer 66 on the disk 20 may be adjusted by adjusting the position of the solenoid 108 with respect to the frame 34. As previously mentioned, such an adjustment may be made by simply loosening the screw 116 for the solenoid 108, moving the solenoid 108 to the desired position and then re-tightening the screw 116**.

Information may be read from or written on tracks on the disk 20 which are at varying distances from the center of the disk 20; and, for this purpose, the carriage 58 and the head 66 may be moved toward or away from the center of the disk 20 by rotating the lead screw 59 under the action of the stepping motor 64. The proper positioning of the carriage 58 with respect to the center of the disk 20 utilizing the stepping motor 64 may be done either before the head 66 is moved into engagement with the disk 20 or may be done while the head 66 remains in engagement with the disk 20.

When it is desired that the other side of the disk 20 be used for the reading or writing action utilizing the transducer 68, the solenoid 110 is energized instead of the solenoid 108. The solenoid 110 is effective in substantially the same way as the solenoid 108 for bringing a transducer (66 or 68) into information transferring contact with the disk 20. When the solenoid 110 is energized, the eccentric 90 is swung about its journals 94 against the centering action of the centering mechanism 118 toward the solenoid 110, and the carriage 58 is correspondingly swung about the screw 59 to bring transducer 68 into information transferring contact with the disk 20. In this case, the fixed pads 70 and 72, in particular, support the disk 20 through the medium of the envelope 22.

Figure 2:
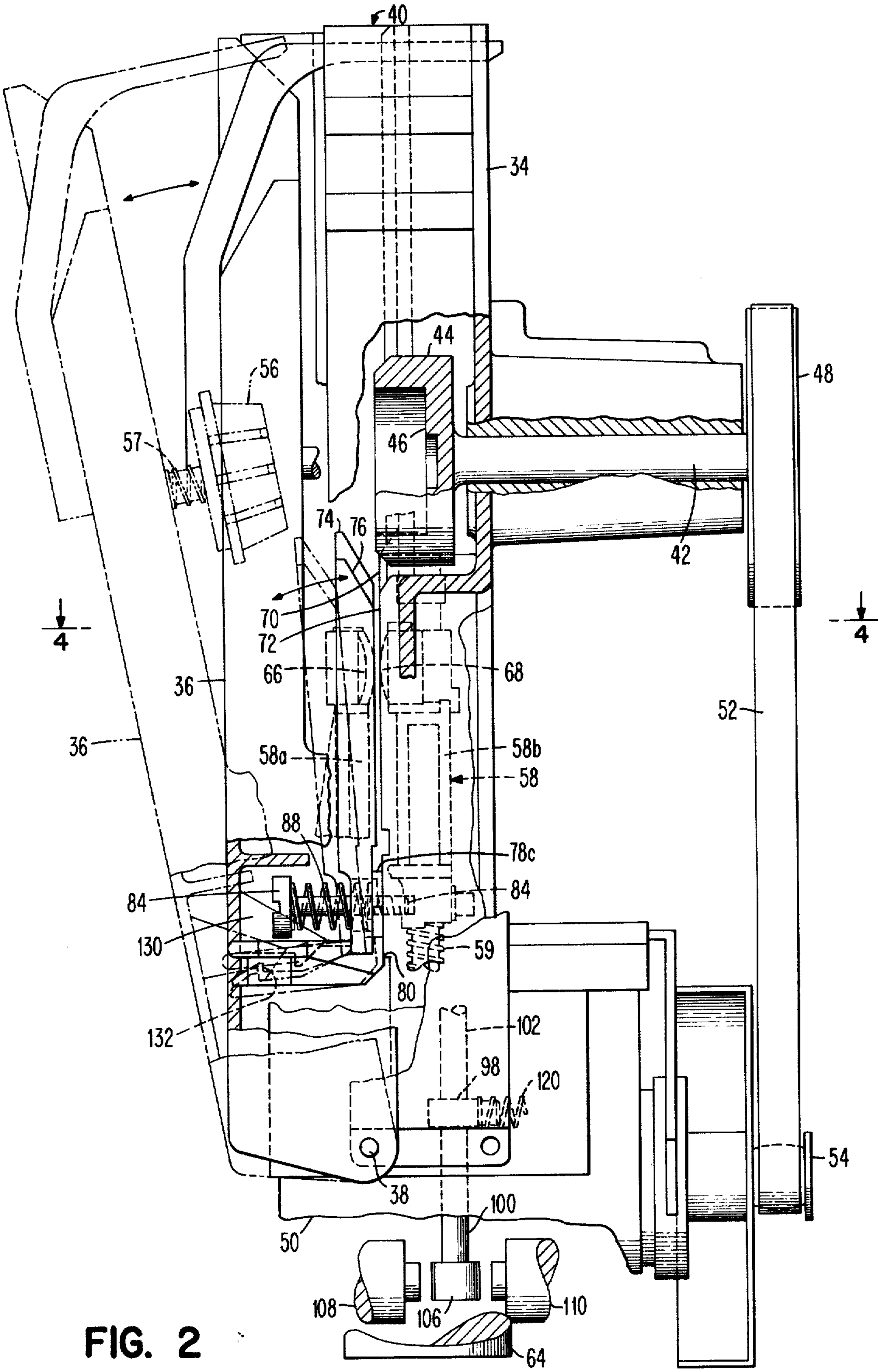
FIG. 2 is a side elevational view of data storage apparatus which uses the flexible magnetic disk of FIG. 1 and which is partially broken away for illustrating certain internal constructions.
Figure 3:
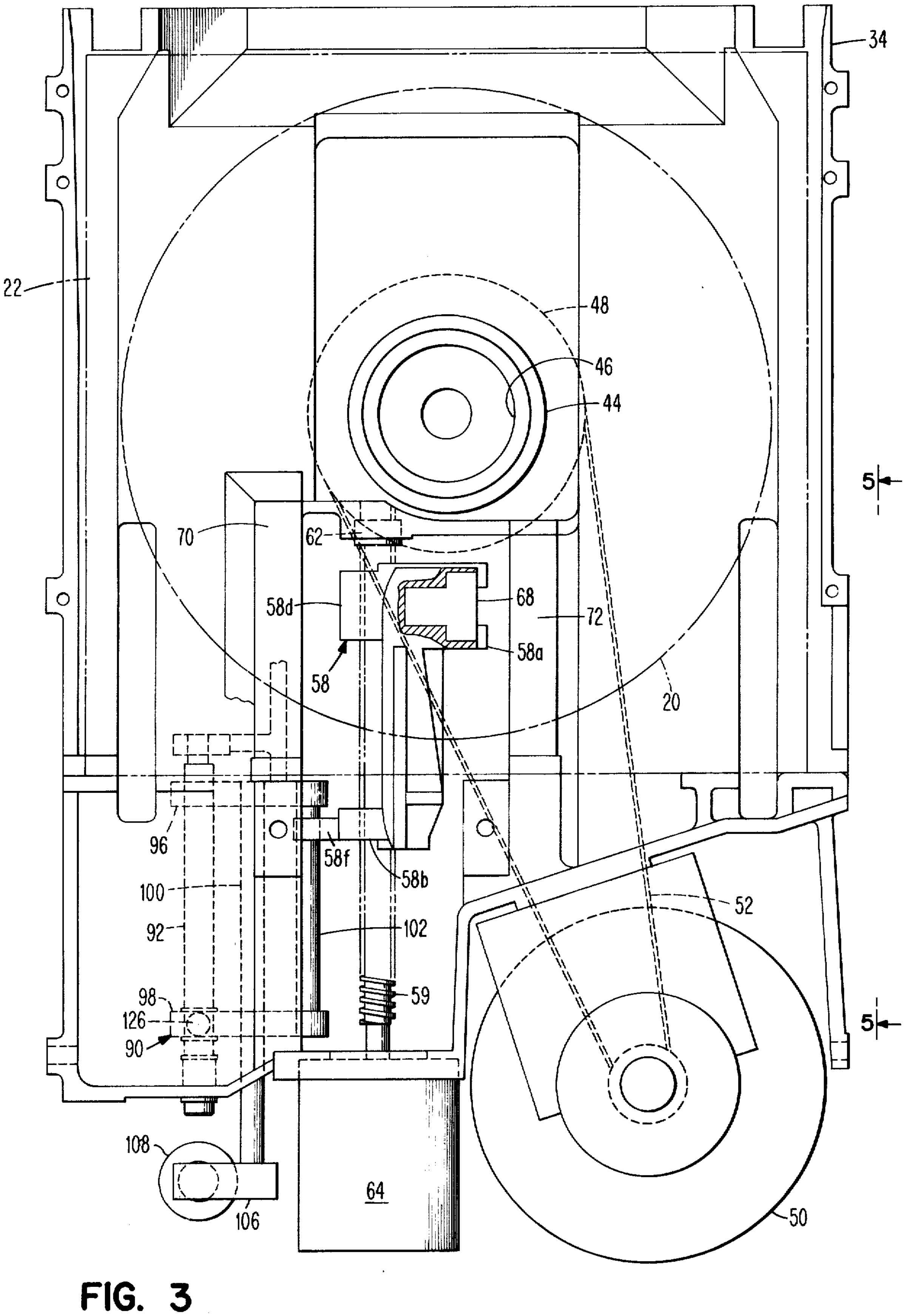
FIG. 3 is a front elevational view of the data storage apparatus.

When the reading or writing action on the disk 20 has been finished, the cover 36 is unlatched with respect to the frame 34 and is swung counterclockwise as seen in FIG. 2 about the pivot 38. This has the effect of rotating the pad member 78 about its pivot edge 80 against the action of the springs 86 and 88 by virtue of the interconnection 128 between the cover 36 and pad member 78; and the assembly 18 is thus released with respect to the pads 70, 72, 74 and 76. The disk assembly 18 is then moved upwardly out of the slots 40 so as to thereby remove it from the machine.

The data storage mechanism of the invention advantageously utilizes the four pads 70, 72, 74 and 76 all of which are fixed when the disk assembly 18 is in position and which hold the disk assembly fixed for a reading or writing action. The carriage 58 containing the transducers 66 and 68 is swingable slightly out of a neutral position about the lead screw 59 due to the action of one of the solenoids 108 and 110 for moving one of the transducers 66 and 68 into forcible information transferring contact with the disk 20 held gripped by the pads 70, 72, 74 and 76. The force on the transducer is sufficient so that the disk 20 is slightly bent around the active surface of the transducer to have a firm, reliable reading and writing engagement with the transducer.

We claim:

1. A magnetic storage device comprising a thin flexible magnetic disk, means for rotating said disk, a first pair of spaced pressure pads located at a first face of said disk and a second pair of spaced pressure pads located at the second face of said disk and disposed oppositely with respect to said first pair of pressure pads, means for holding said first and second pairs of pressure pads fixed with respect to each other so that they grip said magnetic disk, a pair of magnetic heads located opposite each other and at opposite faces of said disk and each magnetic head being disposed between said pressure pad at the face of the disk at which the magnetic head is located, a carriage for connecting said magnetic heads together so that they move together, and means for moving said carriage to bring one or the other of said magnetic heads into forceful contact with a face of said disk with the disk being held from movement against the action of the head being moved into contact with a face of the disk by said pair of pressure pads located at the opposite face of said disk whereby these pressure pads hold the disk onto and around said head and whereby the head has a firm data transferring contact with said disk.

2. A magnetic storage device as set forth in claim 1 and including an envelope encasing said magnetic disk and provided with a slot therethrough on each face of the envelope through which the corresponding one of said magnetic heads may extend for coming into data transferring contact with a face of said disk.

3. A magnetic storage device as set forth in claim 1 and including a lead screw having a screw threaded engagement with said carriage for carrying said two magnetic heads radially of said disk for causing the heads to be in contact with said disk at various radii as the disk is rotated, said means for moving said carriage including means for swinging the carriage about said lead screw so as to thereby move one or the other of said magnetic heads into contact with said disk.

4. A magnetic storage device as set forth in claim 1 and including a moveable cover for the magnetic storage device, means for mounting one of said pairs of said pressure pads so that these pressure pads may be swung outwardly away from said disk to release the disk, and means interconnecting said cover and said moveable pair of pressure pads so that this pair of pressure pads is moved into an unclamping position with respect to said other pair of pressure pads and said disk when said cover is opened to allow removal of the disk from the magnetic storage device.

* * * * *